UNITED STATES PATENT OFFICE.

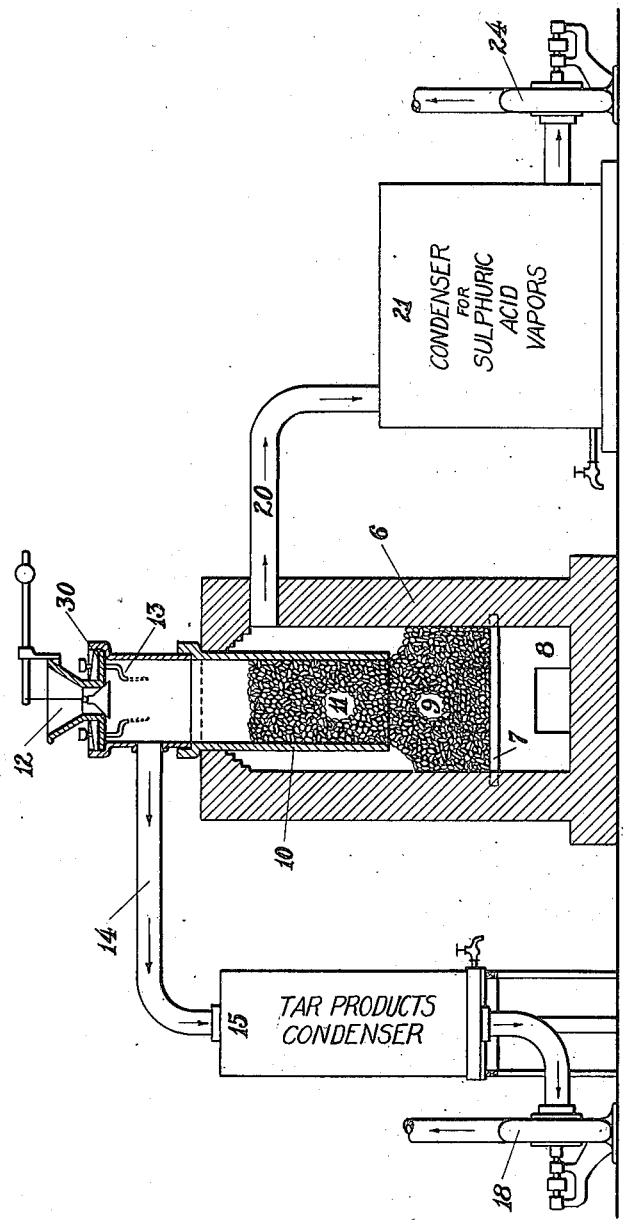

INGENUIN HECHENBLEIKNER AND PETER S. GILCHRIST, OF CHARLOTTE, NORTH CAROLINA, ASSIGNORS TO CHEMICAL CONSTRUCTION CO., OF CHARLOTTE, NORTH CAROLINA, A CORPORATION.

DISTILLING APPARATUS.

1,310,078.  Specification of Letters Patent.  Patented July 15, 1919.

Application filed February 15, 1919. Serial No. 277,151.

*To all whom it may concern:*

Be it known that we, INGENUIN HECHENBLEIKNER and PETER S. GILCHRIST, citizens of the United States, residing at Charlotte, in the county of Mecklenburg and State of North Carolina, have invented certain new and useful Improvements in Distilling Apparatus, of which the following is a specification.

This invention relates to an apparatus used for the recovery of the valuable constituents of sludge acid, and forms a part of the apparatus described in connection with our application for a patent on a process for the treatment of such acid, Serial No. 277,150, filed February 15, 1919.

This process involves the treatment of sludge acid in a furnace so constructed that the aqueous and tarry constituents of the acid are distilled off at a first stage of lower temperature, and the sulfuric acid gas is distilled off at a second stage of higher temperature; and the present application relates to the furnace or still used in performing the process.

This furnace is illustrated in the accompanying drawing, which is a sectional elevation of the furnace.

The furnace or still consists of an outer cylindrical casing 6, which may be constructed of suitable acid resisting masonry. It is provided with a grate 7 below which is an ash pit 8. Depending through the top of this casing is a cylinder 10 made of acid and heat resisting material. This is provided at the top with a bell hopper 12 through which fuel may be fed from time to time. The cylinder is closed at the top by a cover 30 through which extends a plurality of luted drip pipes 13, through which the sludge acid is fed onto the bed of coals below.

Fuel is fed into the furnace in sufficient quantity to fill the space between the grate and the cylinder, and to partly fill the cylinder itself. This provides two combustion zones, one within the cylinder, and the other between the cylinder and the grate. Forced or other draft may be used, and the construction provides a higher temperature zone in the lower bed of fuel 9 and a lower temperature zone in the upper bed of fuel 10.

A gas outlet 14 leads from the upper part of the cylinder, and a gas outlet 20 leads from the upper part of the annular space between the cylinder and the outer casing. The gases which come off at the lower temperature pass through the pipe 14 to a suitable condenser apparatus 15, and the gas from the higher temperature zone passes off through the pipe 20 to another condensing or precipitating apparatus indicated at 21. The respective products may be condensed in these separate condensers, the waste gases being drawn off by exhaust fans 18 and 24 respectively, connected to the separate condensers.

The sludge acid is fed continuously through the drip pipes 13 onto the bed of fuel in the cylinder and its most volatile constituents are vaporized at the upper or inner zone and pass off through the pipe 14. The least volatile constituents are vaporized at the lower or hotter zone and pass off through the pipe 20 to the other condenser.

The apparatus therefore includes a still for fractional distillation accomplished in two stages of zones, with a separate delivery from each, and will be found very efficient for the treatment of sludge acid and also possibly for the treatment of other matter in which it is desirable to separate more or less volatile constituents in a single still, and in a continuous manner. It is obvious that the operation can proceed continuously as long as the material to be treated and the necessary fuel are supplied.

What we claim as new is:

1. A distilling furnace comprising a lower fuel chamber, an upper fuel chamber communicating therewith, means to feed the material to be treated into the upper fuel chamber, and separate vapor outlets from the chambers respectively, and separate condensers to which said outlets lead respectively.

2. A distilling furnace comprising an outer casing with a grate therein to support a lower body of fuel, an inner container in the casing, above the grate, to confine an upper body of fuel and feed the same downwardly to the lower body, a gas outlet from the chamber in the outer casing above the lower body of fuel, and a separate gas outlet from the upper part of the container, above the upper body of fuel, and separate condensers to which said outlets lead respectively.

3. A distilling apparatus, comprising a furnace having lower and higher temperature fuel zones, means to feed the material to be distilled first to the lower and then to the higher temperature zones, separate vapor outlets from said zones respectively, and separate condensers to which said outlets lead respectively.

In testimony whereof, we affix our signatures in presence of two witnesses.

INGENUIN HECHENBLEIKNER.
PETER S. GILCHRIST.

Witnesses:
GEO. L. SIBLEY,
JAS. L. WILLIAMSON.